H. W. PLEISTER.
CONDUIT OR CABLE CLAMP AND BRIDLE RING.
APPLICATION FILED OCT. 27, 1920.

1,381,236.

Patented June 14, 1921.

INVENTOR
Henry W. Pleister
BY
Alan M. Johnson
ATTORNEY

UNITED STATES PATENT OFFICE.

HENRY W. PLEISTER, OF WESTFIELD, NEW JERSEY, ASSIGNOR TO HENRY B. NEWHALL, EXECUTOR OF HENRY B. NEWHALL, SR., DECEASED.

CONDUIT OR CABLE CLAMP AND BRIDLE-RING.

1,381,236.    Specification of Letters Patent.    Patented June 14, 1921.

Application filed October 27, 1920. Serial No. 419,830.

*To all whom it may concern:*

Be it known that I, HENRY W. PLEISTER, a citizen of the United States, residing at Westfield, in the county of Union and State of New Jersey, have invented certain new and useful Improvements in Conduit or Cable Clamps and Bridle-Rings, of which the following is a specification, taken in connection with the accompanying drawings.

My invention relates to the combination of a conduit or cable clamp and a bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp having the lower part of the base bent out to form a flange, the flange being provided with one, or two parallel slots, to coöperate with a rectangular shank of a flat or round bridle ring.

My invention further relates to a conduit or cable clamp which is preferably formed out of pressed sheet material, as pressed steel, or which may be formed from castings of malleable iron, brass, an alloy, aluminum or any other metal.

My invention further relates to certain combinations, sub-combinations, articles of manufacture, and details of construction, all of which will be more fully hereinafter described and pointed out in the claim.

In the figures, in which I have shown different embodiments of my invention, the same reference numerals refer to similar parts in the several figures.

Figure 1:
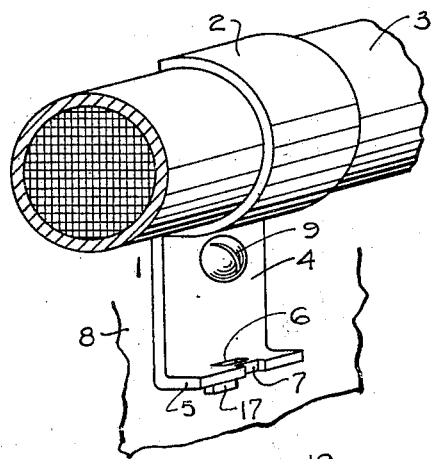
Figure 1 is a perspective view of my conduit or cable clamp and of a cable which it supports.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demand it, my bridle ring may be supported by the same conduit or cable clamp, when the complete combination would be used.

In my invention I form my conduit or cable clamp 1 with a hook portion 2, which engages with and supports a conduit or cable 3. The clamp is provided with a base 4 the lower end of which is bent out at substantially right angles to the base 4 to form the flange 5. In the preferred construction, this flange is provided with a slot 6 and also with a parallel slot 7.

Figure 2:
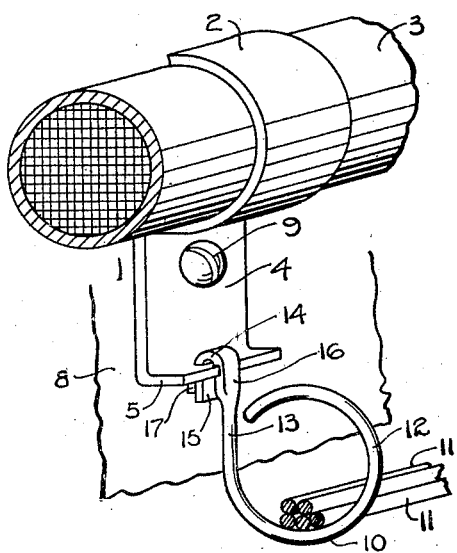
Fig. 2 is a perspective view of the conduit or cable clamp shown in Fig. 1 with the addition of a round pigtail bridle ring having its end flattened and bent back on itself to coöperate with the parallel slots shown in Fig. 1.
Figure 3:
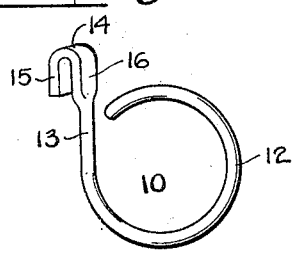
Fig. 3 is a perspective view of the pigtail bridle ring shown in Fig. 2.

When the conduit or cable 3 is first installed it is held to the wall or other suitable support 8 by means of the clamp and the securing screw 9. Weeks, months, or years later should the traffic load become excessive the capacity of the installation can be readily increased by means of the bridle rings 10, Fig. 3, which support runs of bridle wires 11, 11, Fig. 2. In Figs. 2 and 3 I have shown the pigtail bridle ring 10 formed from round stock as for example wire, having an open ring 12 and a shank 13. The end of this shank is flattened and bent back upon itself to form a hook 14 having the rectangular arms 15 and 16.

This bridle ring can be readily secured to the conduit or cable clamp 1 by threading the arm 15 through the slot 6. At the same time that this is done the arm 16 will be received within the second parallel slot 7.

These two slots serve to securely hold the bridle ring to the conduit or cable clamp and tend to prevent excessive rocking movement of the bridle ring within the flange 5 of the clamp.

Preferably, though not necessarily, I form an integral finger 17 on the base 4 which extends below the plane of the flange 5 and acts as an abutment or rest for the arm 15. When the conduit or cable clamp is formed out of pressed sheet metal, that part of the metal of the base, which is punched out to form the slot 6 forms the finger 17.

Figure 4:
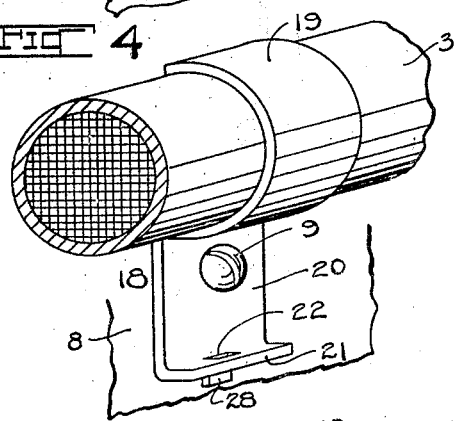
Fig. 4 is a perspective view of a modified form of my conduit or cable clamp.
Figure 5:
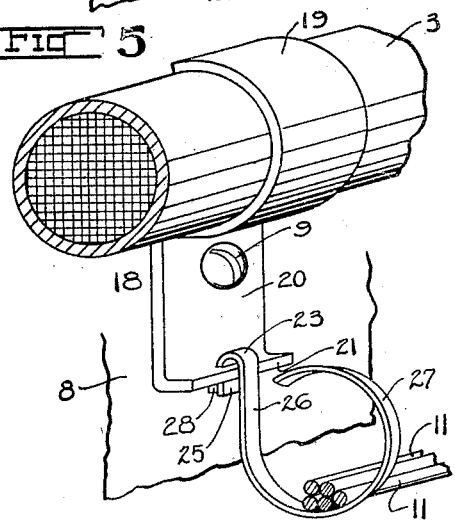
Fig. 5 is a perspective view of the conduit or cable clamp shown in Fig. 4 with the addition of a pigtail bridle ring formed from flat sheet metal.
Figure 6:
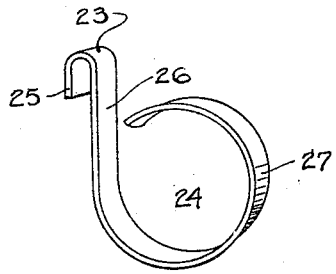
Fig. 6 is a perspective view of the pigtail bridle ring shown in Fig. 5.

In Figs. 4, 5 and 6 I have shown a conduit or cable clamp 18 having the hook portion 19, the base 20 and the flange 21, the same as the corresponding elements in the other figures, except that this flange 21 is provided with only one slot 22 to coöperate with the hook 23 of the flat pigtail bridle ring 24. In this construction the arm 25 is threaded through the rectangular slot 22, while the shank 26 engages on the exterior of the flange 21, the open ring 27 hanging below the level of the clamp.

In this form I also preferably, though not necessarily, provide the base with a finger 28 which acts in the same manner as the finger 17 and throws the bridle ring out from the wall 8 so that the runs of bridle wires 11, 11 cannot rub or chafe on the surface of the wall or other suitable support.

To disengage either bridle ring it is merely necessary to raise it vertically so as to free the hook from the slot or slots in the flange, when it can be used, with the messenger wires in any other suitable location. Both the attaching and the detaching of the bridle rings can be accomplished without loosening the securing screw 9.

Having thus described this invention in connection with illustrative embodiments thereof, to the details of which I do not desire to be limited, what is claimed as new and what is desired to secure by Letters Patent is set forth in the appended claim.

What I claim is:—

In a conduit or cable clamp the combination of a hook portion to engage and support a conduit or cable and a base to lie against a wall or other suitable support, a portion of the base being bent out to form a flange, the flange being provided with two parallel slots to coöperate with the shank of a bridle ring.

HENRY W. PLEISTER.

Witnesses:
MARY R. RYAN,
A. M. WILLIAMS.